(12) United States Patent
Chen et al.

(10) Patent No.: US 8,917,951 B1
(45) Date of Patent: Dec. 23, 2014

(54) METHOD OF ON-THE-FLY IMAGE STITCHING

(71) Applicant: Hong Kong Applied Science and Technology Research Institute Company Limited, Hong Kong (HK)

(72) Inventors: Zuoping Chen, Hong Kong (HK); Xiaohua Wu, Hong Kong (HK)

(73) Assignee: Hong Kong Applied Science and Technology Research Institute Company Limited, Hong Kong Science Park Shatin, New Territories, Hong Kong (CN)

( * ) Notice: Subject to any disclaimer, the term of this patent is extended or adjusted under 35 U.S.C. 154(b) by 8 days.

(21) Appl. No.: 13/945,919

(22) Filed: Jul. 19, 2013

(51) Int. Cl.
- *G06K 9/36* (2006.01)
- *G06K 9/62* (2006.01)
- *G06K 9/46* (2006.01)
- *G06T 11/60* (2006.01)

(52) U.S. Cl.
CPC ............. *G06K 9/6202* (2013.01); *G06K 9/46* (2013.01); *G06T 11/60* (2013.01); *G06K 2009/4666* (2013.01); *G06K 2009/6213* (2013.01); *G06T 2207/20221* (2013.01)
USPC ........... 382/276; 382/218; 382/219; 382/284; 382/293

(58) Field of Classification Search
USPC .......... 382/276, 218, 219, 284, 293; 345/427, 345/629; 348/36, 39, 218.1, E5.047, 348/E5.053; 702/155, 157, 166.158
See application file for complete search history.

(56) References Cited

U.S. PATENT DOCUMENTS

| | | | |
|---|---|---|---|
| 6,456,323 B1 * | 9/2002 | Mancuso et al. | 348/218.1 |
| 6,618,511 B1 * | 9/2003 | Mancuso et al. | 382/293 |
| 6,677,981 B1 * | 1/2004 | Mancuso et al. | 348/36 |
| 6,717,608 B1 * | 4/2004 | Mancuso et al. | 348/36 |
| 6,771,304 B1 * | 8/2004 | Mancuso et al. | 348/39 |
| 6,885,392 B1 * | 4/2005 | Mancuso et al. | 348/36 |
| 7,006,111 B1 | 2/2006 | Rothrock | |
| 7,778,485 B2 | 8/2010 | Zeineh et al. | |
| 8,041,147 B2 | 10/2011 | Molnar et al. | |
| 8,606,540 B2 * | 12/2013 | Haisty et al. | 702/157 |

FOREIGN PATENT DOCUMENTS

| | | |
|---|---|---|
| CN | 100433060 C | 11/2008 |
| CN | 101751659 B | 7/2012 |

* cited by examiner

*Primary Examiner* — Anh Do (74) *Attorney, Agent, or Firm* — Ella Cheong Hong Kong; Sam T. Yip (57) ABSTRACT

The presently claimed invention provides a method for stitching a plurality of images together in a way with least memory and CPU usage, and minimum file input and output, while still possessing fast computation speed to avoid post-scan delay for whole slide viewing and good stitching quality. The method of the present invention comprises the steps of calculating featureness of each candidate strip of a image by applying a mathematical transformation, calculating offset of the strip with correlation maximum location, calculating stitching reliability of the candidate strip from the pre-defined weighted function of its featureness and the correlation coefficients of each matching block, and determining optimal stitching path with stitching reliability.

19 Claims, 10 Drawing Sheets

METHOD OF ON-THE-FLY IMAGE STITCHING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the field of digital image processing. More particularly, the present invention relates to the field of digital image stitching.

BACKGROUND

In some cases, a large view is unable to be captured in a single image with a camera at a time. Thus, several images are captured, following with digitally combining or stitching them into a larger image. For example, a camera, placed on a holder, is moved to capture sequential images with certain amount of overlapping between the images. Then, the images are digitally captured, or otherwise scanned or converted into a digital format.

A typical example is pathology-slide microscopic scanning. Due to the field of view limitation of objective lens and high power magnification requirement, a single image is not enough to acquire the whole picture of pathology in details. Instead, a series of images is taken, which are further stitched to form into a whole image.

Regarding a traditional stitching technique, a user can position the digital images as thumbnails of the larger image, further with combining them together. Alternatively, the sequence of image stitching is determined. For both cases, the images need be firstly loaded into memory, and then stitched together to form a single and larger image. Stitching images can be achieved through an edge detection technique to determine where the images overlap. The images are then loaded into memory and stitched with the stitched image in memory. This process is repeated several times till all images being stitched into a magnified image.

This technique is regarded as effective when only a few images with low resolution are stitched. Nonetheless, in the case of having a large number of images with high resolutions, a large amount of memory is required but it is hardly provided under various circumstances.

Regarding the problem of memory under overloading, one well-known technique is to store only one of the three color channels in memory, thus largely reducing the amount of memory needed by two-thirds. Nevertheless, with respect to images with high resolution, the memory consumption is still enormous. Alternatively, one can save the unit images as digital files first and reload them in later stitching, this method can avoid the large memory usage but the repeated image loading will slow down the whole stitching process.

U.S. Pat. No. 8,041,147 provides a method for stitching and showing image blocks of an electronically recorded multipart image, in which relative positional offset values of the image blocks recorded with overlap are determined in a coordinate system in directions x and y, and stored in a matrix format. The image blocks to be presented are stitched together on the basis of the stored values.

U.S. Pat. No. 7,006,111 discloses a digital stitching method where the offset values between overlapping images are predicted from their lower resolution versions, further being refined by a search process recursively.

U.S. Pat. No. 7,778,485 teaches systems and methods for stitching image blocks to create seamless magnified images of a microscope slide. Stitching is executed when the field of view of display is changed by using the pre-calculated relative positional offset values and correlation coefficient.

Nevertheless, the abovementioned methods still fail to provide a stitching technique employing least memory and CPU usage, as well as providing fast stitching speed and good quality.

SUMMARY OF THE INVENTION

Accordingly, the presently claimed invention is to provide a method for stitching a plurality of images together in a way with least memory and CPU usage, and minimum file input and output, while still providing fast computation speed to avoid post-scan delay for whole slide viewing and good stitching quality.

In accordance to an embodiment of the presently claimed invention, a method is provided for stitching a plurality of images, comprising the steps of calculating featureness of each candidate strip of a image by applying a mathematical transformation of the spatial pixel information within the candidate strip into frequency domain expression with co-existing physical location information, calculating a candidate feature point comprising at least one pixel, based on the spatial and frequency information of the mathematical transform, taking the candidate feature point for locating a matching block, comparing intensities of the matching block with intensities of searching blocks from a search area of another image to find out a maximum correlation coefficient, calculating strip-offset between the two images with an offset value from the matching block determined by correlation maximum location, calculating stitching reliability for each candidate strip from the pre-defined weighted function of its featureness and the maximum correlation coefficients of the matching block, repeating the above steps for the remaining images, and determining an optimal stitching path with the stitching reliabilities.

In accordance to various embodiments of the presently claimed invention, the featureness is a degree of image detail, containing variation or amount of edges, and is calculated based on the energies of the transformed regions. Since the wavelet transform provides the spatial information through the index of the transform coefficients, and frequency information through the magnitude of the transform coefficients, a candidate feature point is acquired through selecting the maximum among the high frequency coefficients, and further taking the index of the maximum to find out the position of the candidate feature point.

In accordance to various embodiments of the presently claimed invention, the matching block takes the candidate feature point comprising at least one pixel as its center. The size of matching block is predefined according to the applications. The intensities in the matching block are compared with the intensities of searching block to calculate the correlation coefficient, following with finding out the strip-offset with an offset value determined by correlation maximum location.

In accordance to various embodiments of the presently claimed invention, the stitching reliability of the candidate strip is calculated from the pre-defined weighted function of its featureness and the maximum correlation coefficient.

In accordance to another embodiment of the presently claimed invention, more than one matching block in a candidate strip is used. The pre-defined weight sun sum of offset from each matching block is used to calculate the strip-offset. And the stitching reliability of the candidate strip is calculated from the pre-defined weighted function of its featureness and the maximum correlation coefficients of each matching block.

In accordance to one embodiment of the presently claimed invention, the best connection route is calculated through reliability-oriented global max-span tree.

BRIEF DESCRIPTION OF THE DRAWINGS

Embodiments of the present invention are described in more detail hereinafter with reference to the drawings, in which.

DETAILED DESCRIPTION OF PREFERRED EMBODIMENTS

In the following description, a method for stitching a plurality of image is set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
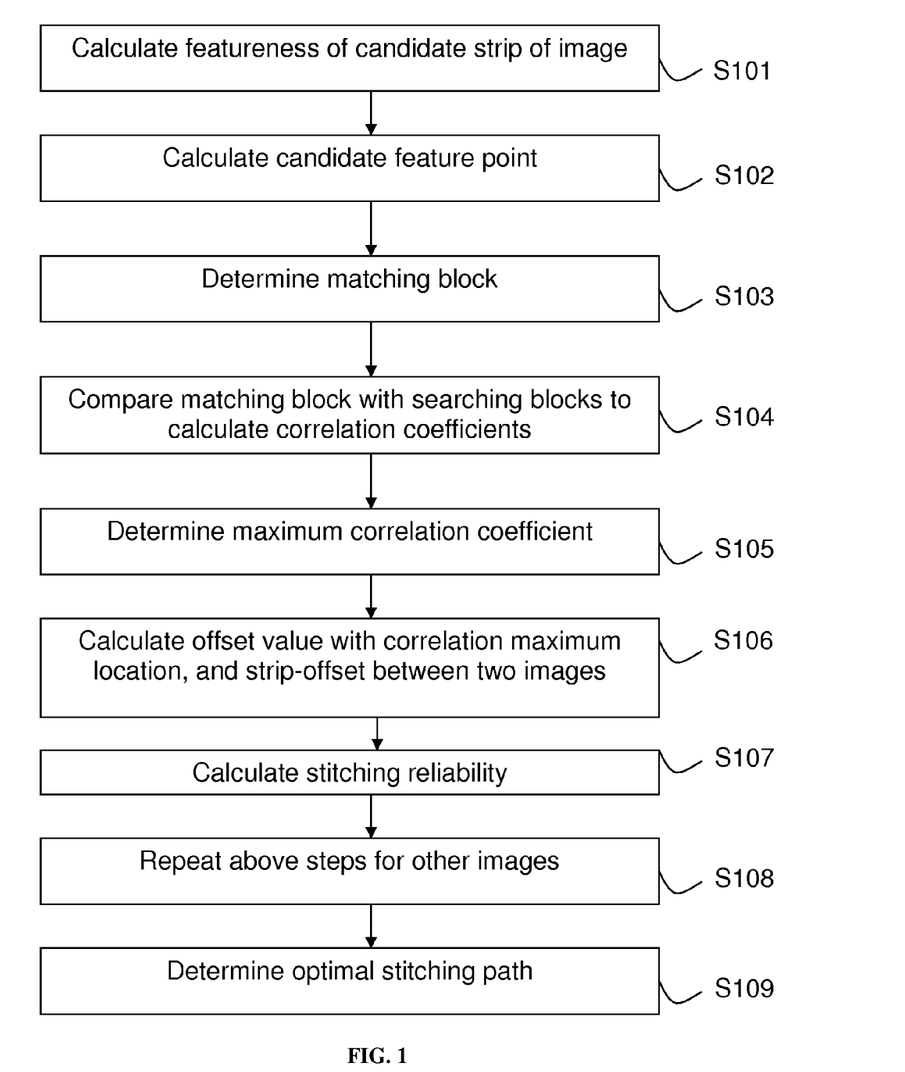
FIG. 1 shows a process flow diagram illustrating the steps of a method for stitching a plurality of image according to one embodiment of the presently claimed invention.

FIG. 1 shows a process flow diagram illustrating the steps of a method for stitching a plurality of image according to an embodiment of the presently claimed invention. In step 101, featureness of a candidate strip of an image is calculated. In step 102, a candidate feature point is calculated. In step 103, a matching block is determined based on the candidate feature point comprising at least one pixel. In step 104, the matching block is compared with a plurality of searching block in a search area of another image to calculate their correlation coefficients. In step 105, a maximum correlation coefficient is selected from the correlation coefficients. In step 106, offset value is calculated based on correlation maximum location, following with calculating strip-offset between the two images. In step 107, stitching reliability is calculated based on the featureness and the maximum correlation coefficient. In step 108, the above steps are repeated for other images. In step 109, an optimal stitching path is determined based on the stitching reliability for connecting all images together.

Figure 2:
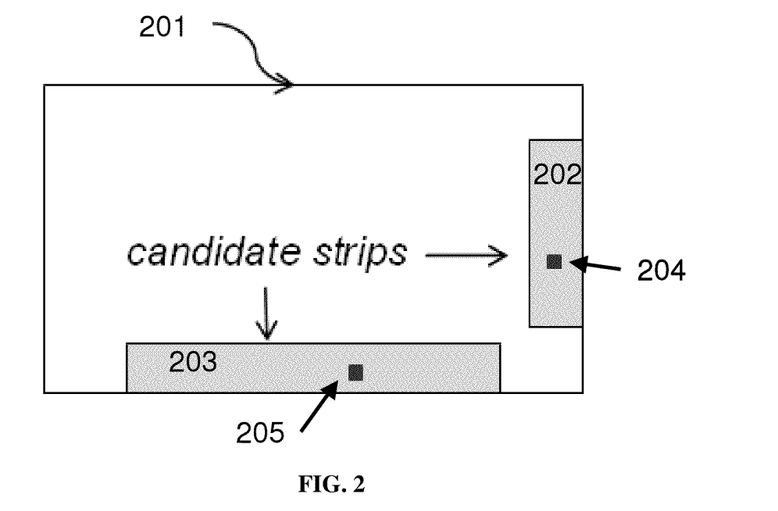
FIG. 2 shows an image having candidate strips and matching blocks according to one embodiment of the presently claimed invention.
Figure 3:
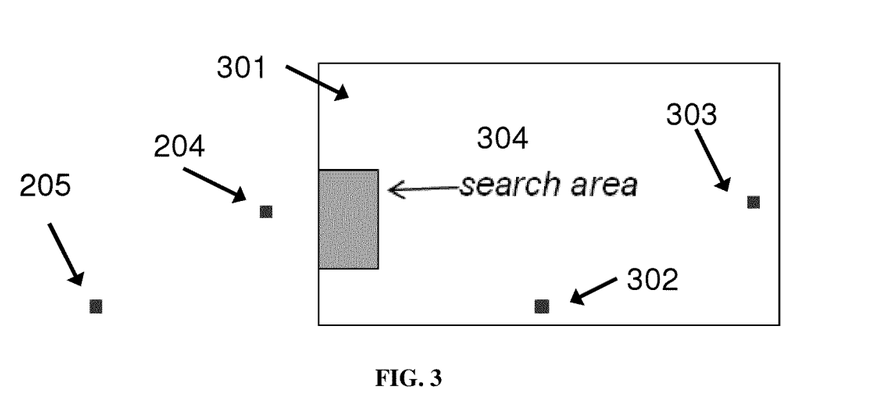
FIG. 3 shows an image having a search area according to one embodiment of the presently claimed invention.

The above method is illustrated with the below drawings and description according to one embodiment of the presently claimed invention. 3×3 images with smaller in size are firstly stored in an archive. As shown in FIG. 2, a first image 201 is loaded into a RAM, following with saving two candidate strips 202 and 203 of the first image 201. Featureness of the candidate strips 202 and 203 are calculated, following with calculating positions of the matching blocks 204 and 205 respectively. Then, the matching blocks 204 and 205 are stored in the RAM, while the candidate strips 202 and 203 are removed from the RAM. The first image 201 is compressed and saved back to the archive. Similarly, as shown in FIG. 3, a second image 301 is loaded into the RAM, and featureness and positions of two matching blocks 302 and 303 are calculated. Moreover, a search area 304 is saved in the RAM.

Figure 3A:
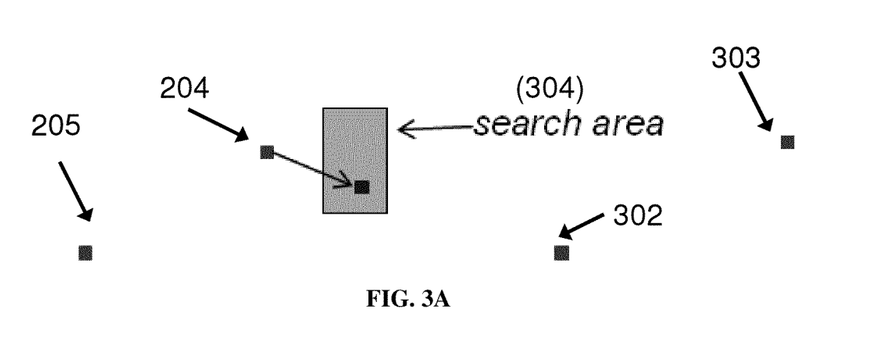
FIG. 3A shows how a matching block is compared with a searching block in a search area according to one embodiment of the presently claimed invention.
Figure 4:
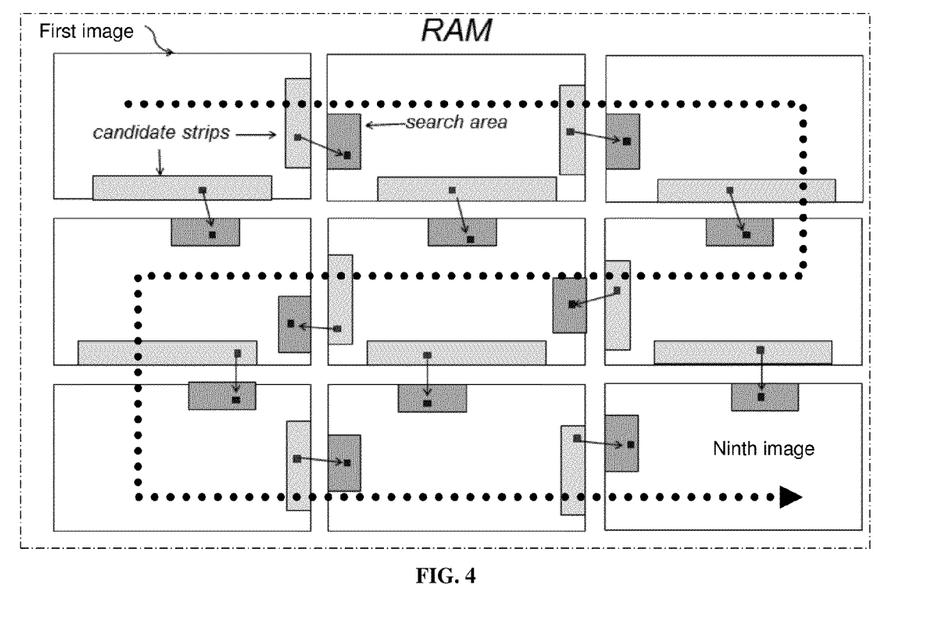
FIG. 4 shows a schematic diagram, in which maximum correlation coefficients and strip-offsets for nine images are determined in sequence according to one embodiment of the presently claimed invention.

As shown in FIG. 3A, the matching block 204 is compared with a plurality of searching block in the search area 304 in order to calculate correlation coefficients of the matching block 203 with respect to different searching blocks in the search area 304. The maximum correlation coefficient is selected from the correlation coefficients having the largest value. A strip-offset between the first image and the second image is determined by an offset value of the matching block 204 based on a correlation maximum location. Both the maximum correlation coefficient and the strip-offset are stored in the RAM. Then, the matching block 204 and the search area 304 are purged out from the RAM. Similar steps are repeated for the remaining images for obtaining their corresponding offset and maximum correlation coefficients. FIG. 4 shows a sequence, indicated with an arrow, in finding out the offset values and maximum correlation coefficients starting from the first image to the ninth image.

Figure 5:
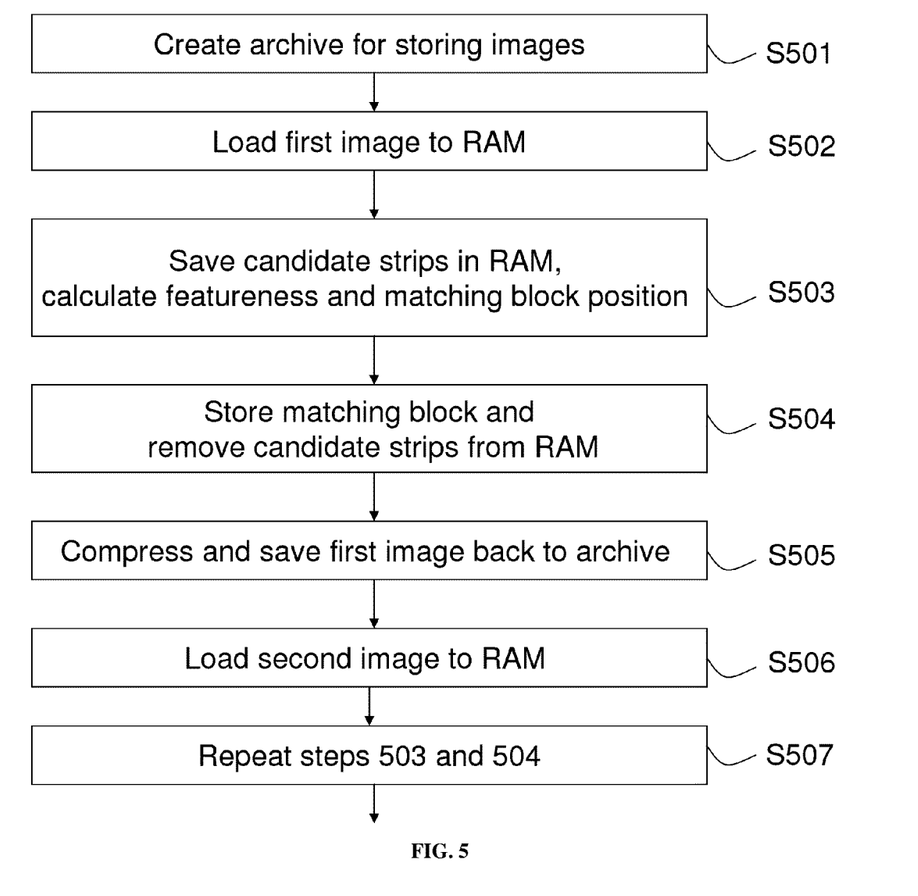
FIG. 5 shows a process flow diagram illustrating the steps of a method for stitching a plurality of images according to another embodiment of the presently claimed invention.

In summary, FIG. 5 shows a process flow diagram illustrating the steps of a method for stitching a plurality of images according to another embodiment of the presently claimed invention. In step 501, an empty archive is created for storing a plurality of digital image. In step 502, a first image is loaded into a RAM. In step 503, one or more candidate strips of the first image are saved in the RAM, further with calculating featureness of the candidate strips and positions of the matching blocks. In step 504, the matching blocks are stored in the RAM, and the candidate strips are removed from the RAM. In step 505, the first image is compressed and saved back to the archive. In step 506, a second image is loaded into the RAM. The step 507 is to repeat the steps from 503 to 504 for the second image. In step 508, a search area of the second image is saved in the RAM. In step 509, the second image is compressed and saved back to the archive. In step 510, the matching block of the first image is compared with a plurality of searching blocks in the search area of the second image for calculating correlation coefficients. In step 511, a maximum correlation coefficient is determined from the correlation coefficients, further with calculating a strip-offset between the first and the second images based on the maximum correlation coefficient. In step 512, the offset and the maximum correlation coefficient are stored in the RAM. In step 513, the matching blocks and the search area are purged out from the RAM. Step 514 is to repeat the above steps for the remaining images. In step 515, an optimal stitching path is determined based on the stitching reliabilities determined by the featureness and the maximum correlation coefficients.

The position and size of the candidate strip are determined by the predefined overlap and its fluctuation due to the hardware precision and misalignment.

The featureness represents the degree of image detail, containing variation or amount of edge, and is used to describe a high frequency ratio. In physics, the featureness corresponds to the high frequency so it can also be defined as variance, standard variance, entropy, laplacian gradient, etc.

In the present invention, after a candidate strip is determined, a specific mathematical transform is applied to it. Preferably, discrete wavelet transform, or all kinds of short-time Fourier transform are employed. Since the transforms preserve the spatial information, referring to the index of transform coefficient, and frequency information referring to the magnitude of transform coefficients, a frequency coefficient with maximum value can be found by travelling all the high frequency coefficients, following with using the index of the maximum to acquire the position of candidate feature point, used for further locating the position of a matching block.

Figure 6:
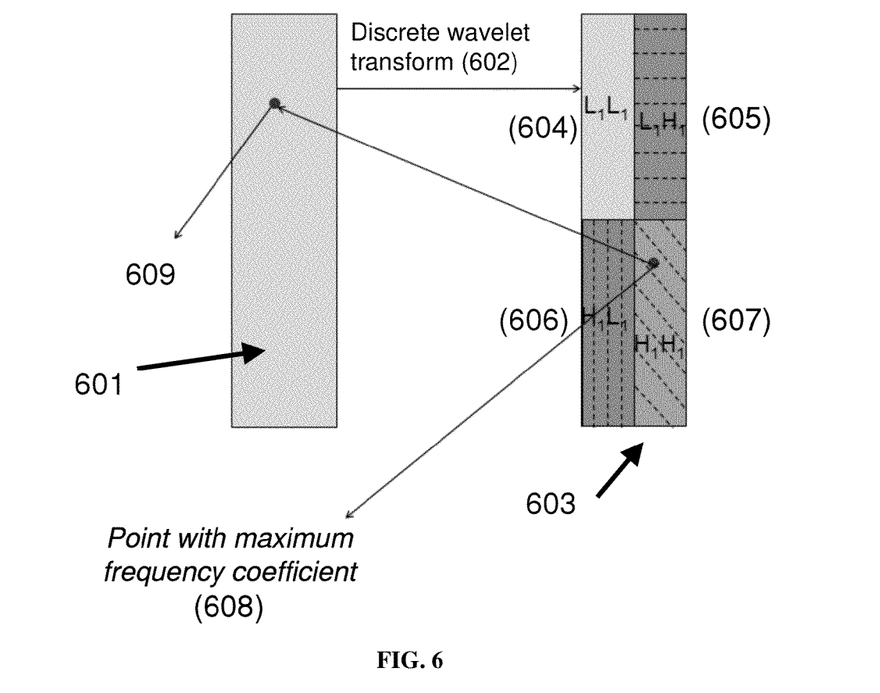
FIG. 6 shows how a candidate strip is transformed into a transformed strip according to one embodiment of the presently claimed invention.

FIG. 6 shows how the featureness of a candidate strip is calculated, following with finding out its candidate feature point according to one embodiment of the presently claimed invention. At first, a candidate strip 601 is transformed into a transformed strip 603 by discrete wavelet transform 602. Four transformed regions are obtained including low-low frequency transformed region $L_1L_1$ (604), low-high frequency transformed region $L_1H_1$ (605), high-low frequency transformed region $H_1L_1$ (606), and high-high frequency transformed region $H_1H_1$ (607). The high frequency coefficients are located in the three transformed regions, $L_1H_1$ (605), $H_1L_1$ (606), and $H_1H_1$ (607).

Frequency coefficients are calculated with discrete wavelet decomposition from level j to j−1 as follows:

$$c_{k_1,k_2}^{j-1} = \Sigma_{n_1}\Sigma_{n_2} h^0{}_{n_1-2k_1,n_2-2k_2} c_{n_1,n_2}^j (L_{j-1}L_{j-1})$$

$$d_{k_1,k_2}^{j-1} = \Sigma_{n_1}\Sigma_{n_2} h^1{}_{n_1-2k_1,n_2-2k_2} c_{n_1,n_2}^j (L_{j-1}H_{j-1})$$

$$e_{k_1,k_2}^{j-1} = \Sigma_{n_1}\Sigma_{n_2} h^2{}_{n_1-2k_1,n_2-2k_2} c_{n_1,n_2}^j (H_{j-1}L_{j-1})$$

$$f_{k_1,k_2}^{j-1} = \Sigma_{n_1}\Sigma_{n_2} h^3{}_{n_1-2k_1,n_2-2k_2} c_{n_1,n_2}^j (H_{j-1}H_{j-1})$$

$h^0 = h \times h^T$, $h^1 = h \times g^T$, $h^2 = g \times h^T$, $h^3 = g \times g^T$ where h and g are FIR quadrature—mirror filters of length N with:

$$g_n = (-1)^n h_{N-1-n}$$

when N is an even number, and where T is a transpose of matrix or vector, and $n_1$ and $n_2$ are integers.

$c_{k_1-k_2}^{j-1}$, $d_{k_1-k_2}^{j-1}$, $e_{k_1-k_2}^{j-1}$, and $f_{k_1-k_2}^{j-1}$ denote low-low frequency coefficient, low-high frequency coefficient, high-low frequency coefficient, and high-high frequency coefficient. $k_1$ and $k_2$ denote the indexes of the transform coefficients.

The energies of the transform coefficients for the four transformed regions are calculated as follows:

$$E_{L_{j-1}L_{j-1}} = \Sigma_{k_1k_2}(c_{k_1k_2}^{j-1})^2 \quad E_{L_{j-1}H_{j-1}} = \Sigma_{k_1k_2}(d_{k_1k_2}^{j-1})^2$$

$$E_{H_{j-1}L_{j-1}} = \Sigma_{k_1k_2}(e_{k_1k_2}^{j-1})^2 \quad E_{H_{j-1}H_{j-1}} = \Sigma_{k_1k_2}(f_{k_1k_2}^{j-1})^2$$

where $E_{L_{j-1}L_{j-1}}$, $E_{L_{j-1}H_{j-1}}$, $E_{H_{j-1}L_{j-1}}$, and $E_{H_{j-1}H_{j-1}}$ denote the energy of low-low frequency, energy of low-high frequency, energy of high-low frequency, and energy of high-high frequency respectively.

According to an embodiment of present invention, when j is equal to 2, the featureness, describing as a high frequency ratio, is calculated as below:

$$\text{featureness} = 1 - \frac{E_{L_1L_1}}{E_{L_1L_1} + E_{L_1H_1} + E_{H_1L_1} + E_{H_1H_1}}$$

where $E_{L_1L_1}$, $E_{L_1H_1}$, $E_{H_1L_1}$, and $E_{H_1H_1}$ denote energies of the transform coefficients with low frequency both in horizontal and vertical directions, with low frequency in horizontal direction but high frequency in vertical direction, with high frequency in horizontal direction but low frequency in vertical direction, with high frequency both in horizontal direction and vertical directions respectively.

The equation of featureness is to calculate the ratio of the high frequency components to the whole frequency components.

A frequency coefficient with maximum value can be found by travelling all the high frequency coefficients, following with using index of the maximum to acquire the position of a candidate feature point, for determining the location of matching box, as shown as follow:

$$(p_1, p_2) = \underset{(k_1,k_2) \in L_1H_1 \cup H_1L_1 \cup H_1H_1}{\arg\max} \{d^1_{k_1,k_2}, e^1_{k_1,k_2}, f^1_{k_1,k_2}\}$$

The $d_{k_1k_2}^1$, $e_{k_1k_2}^1$, and $f_{k_1k_2}^1$ are the high frequency coefficients, and the $k_1$ and $k_2$ are the indexes of the transform coefficients. After selecting the transform coefficient with the maximum magnitude from the high frequency coefficients, the corresponding indexes of the maximum, $k_1$ and $k_2$ are taken for further finding out the coordinates of the candidate feature point comprising a pixel. The $p_1$ and $p_2$ denote the x and y coordinates of the candidate feature point, which corresponds to the center of the matching block of the image.

Figure 7:
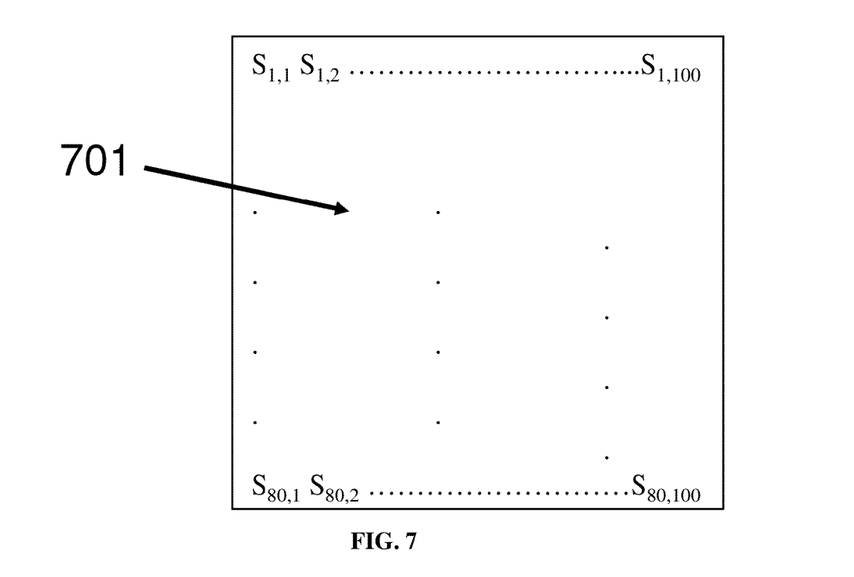
FIG. 7 show an image containing pixel intensities according to an embodiment of the presently claimed invention.
Figure 8:
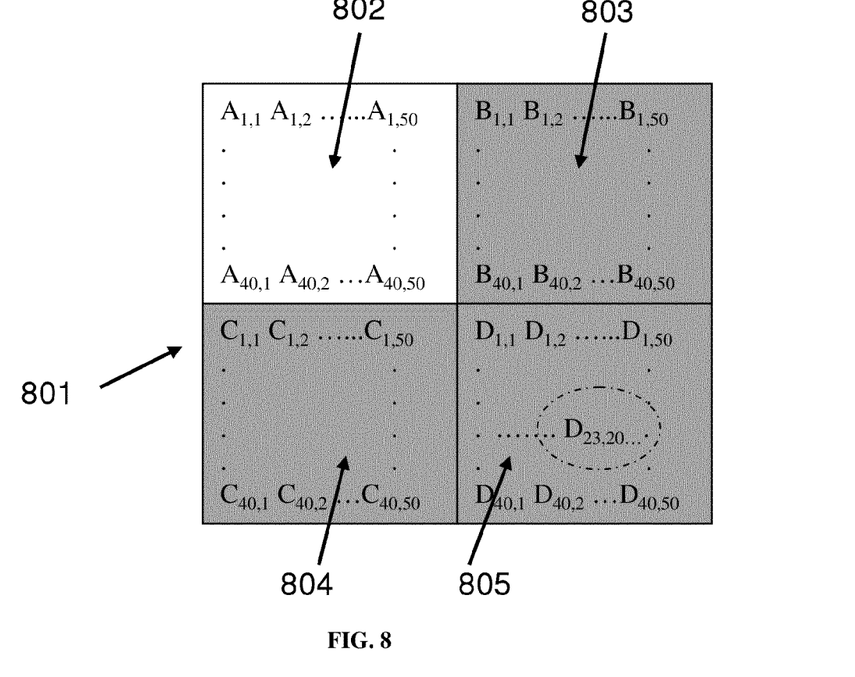
FIG. 8 show a transformed image including four transformed regions according to an embodiment of the presently claimed invention.

FIG. 7-8 shows how to determine a position of a matching block according to an embodiment of the presently claimed invention. As shown in FIG. 7, an original image 701, containing pixel intensities $S_{i,j}$, is transformed into a transformed image 801 as shown in FIG. 8. The transformed image includes four transformed regions 802, 803, 804, and 805, containing transformed coefficients. Both the original and the transformed image have the same size of 100×80 in pixel. The grey areas are where high frequency coefficients are located. Through travelling around the high frequency coefficients in the grey area, $D_{23,20}$ is found to be the maximum among all the high frequency coefficients, and the center of a matching block for the original image 701 is determined at (46, 40), resulted from the index of $D_{23,20}$. The size of the matching block is predefined. In this example, 11×11 in pixel is employed as the size of the matching block.

Figure 9:
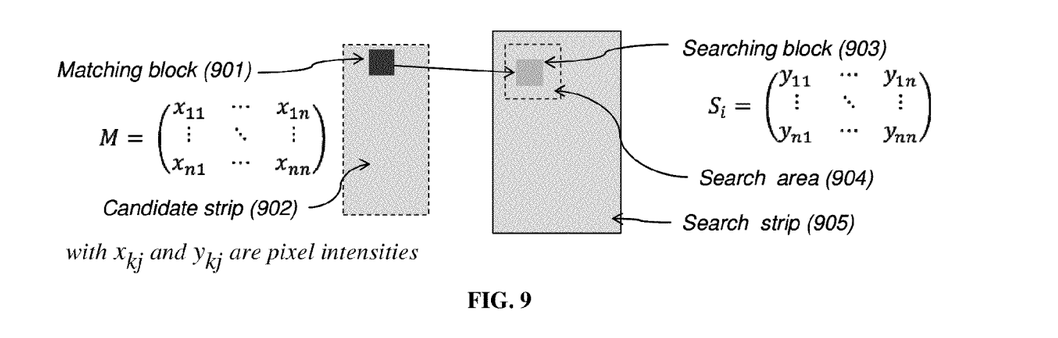
FIG. 9 shows how a matching block is compared with searching blocks in a search area to calculate correlation coefficients according to an embodiment of the presently claimed invention.

The matching block is compared with a plurality of searching block in the search area to find out correlation coefficients, determining the similarity between the matching block and searching block. Each position of the search area corresponds to a searching block. The position and size of search area are determined by the corresponding matching block and overlap fluctuation. The comparison is achieved through comparing the intensity of pixel in the matching block with that in the searching block. As shown in FIG. 9, a matching block, M (901) of a candidate strip 902 contains a matrix of intensity of pixel from $x_{11}$ to $x_{nn}$. A searching block, $S_i$ (903), being an $i^{th}$ searching block in a search area 904 of a search strip 905 contains a matrix of intensity of pixel from $y_{11}$ to $y_{nn}$.

The correlation coefficient between a matching block and $i^{th}$ searching block is calculated as below:

$$c_i = \frac{\sum_{k,j=1}^{n}(x_{kj}-\overline{M})(y_{kj}-\overline{S}_i)}{\sqrt{\sum_{k,j=1}^{n}(x_{kj}-\overline{M})^2}\sqrt{\sum_{k,j=1}^{n}(y_{kj}-\overline{S}_i)^2}} \text{ where}$$

$$\overline{M} = \frac{\sum_{i,j=1}^{n}x_{ij}}{n^2}, \overline{S}_i = \frac{\sum_{i,j=1}^{n}y_{ij}}{n^2},$$

where $\overline{M}$ and $\overline{S}_i$ are the mean intensities of the matching block and $i^{th}$ searching block respectively, $n^2$ is the total number of pixel, and $x_{ij}$ and $y_{ij}$ denote the pixel intensities.

The intensities of pixels in a matching block and a searching block are compared though the following steps, comprising: calculating covariance between a matching block and a searching block (numerator of the equation for $c_i$), calculating the square root of variance of the matching block and searching block respectively and getting the product of them (Denominator of equation for $c_i$), and dividing the covariance by the square root of variance.

After acquiring all the correlation coefficients, the maximum correlation coefficient is determined as follow:

$$c = \max_i \{c_i\}$$

The maximum correlation coefficient, c is selected from the correlation coefficients with the highest magnitude.

After obtaining the maximum correlation coefficient, the offset value of the matching block in the candidate strip is determined by finding its correlation maximum location, which is the position of the searching block whose correlation with the matching block reaches the maximum among all searching blocks from the search area. The offset value is calculated by the position of the matching block and searching block with maximum correlation coefficient. For this, image coordinates will be involved.

Figure 10A:
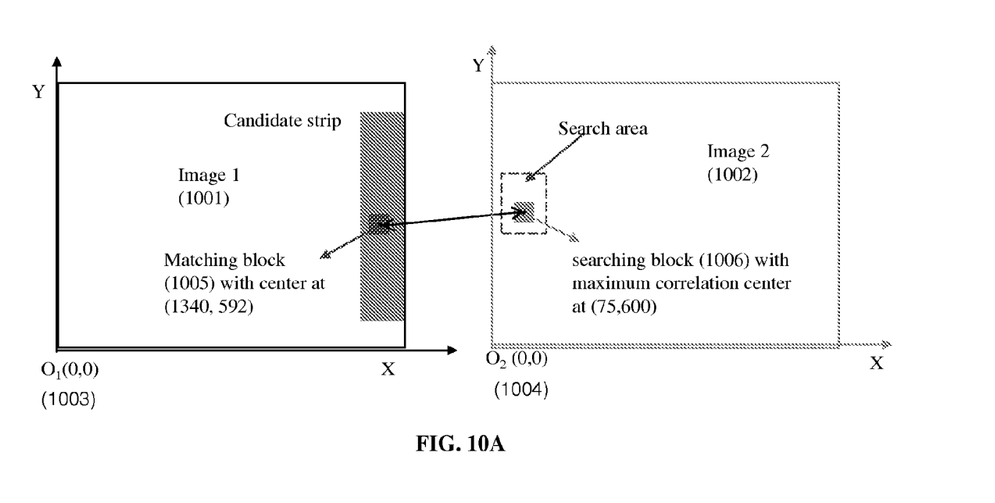
FIG. 10A shows how to calculate offset value of a matching block according to an embodiment of the presently claimed invention.

FIG. 10A shows a schematic diagram in calculation of offset value from a matching block according to an embodiment of the presently claimed invention. There are two images, image 1 (1001) and image 2 (1002) having their own coordinate systems and origins $O_1$ (0,0) (1003) and $O_2$ (0,0) (1004). If a matching block 1005 and its searching block 1006 with maximum correlation locate at (x1,y1) and (x2, y2) in their own image coordinate system. Then the offset value is calculated as follow:

$$Ofx = x1-x2, Ofy = y1-y2.$$

where Ofx denotes an offset value in x-direction, and Ofy denotes an offset value in y-direction.

When a matching block with a center at (1340, 592) is matched with a searching block with maximum correlation center at (75, 600). As (x1,y1) is (1340, 592), and (x2,y2) is (75, 600), so that the offset values are Ofx=1265, Ofy=−8.

Figure 10B:
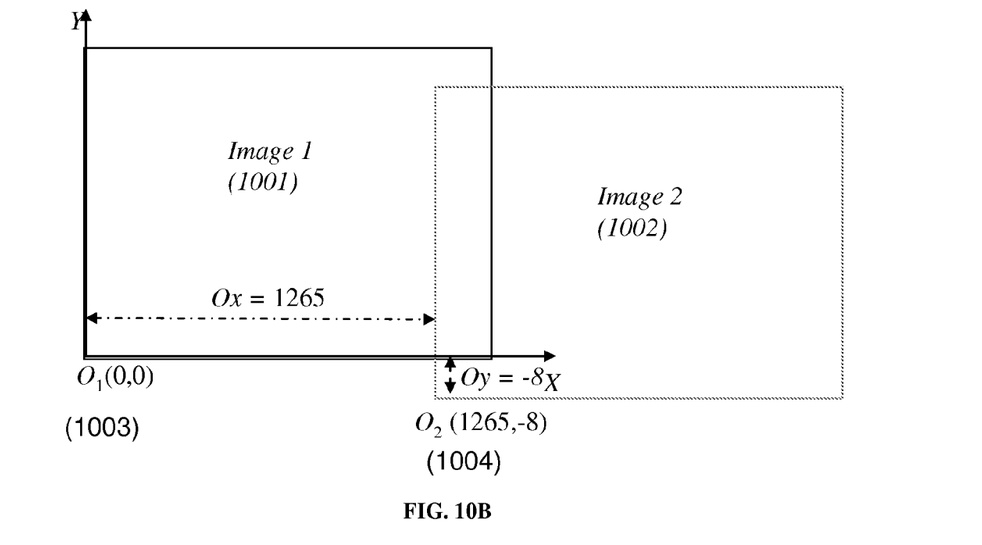
FIG. 10B shows how to calculate strip-offset value between two images according to an embodiment of the presently claimed invention.

After acquiring the offset values from the matching block, a strip-offset is between the two images can be calculated. The strip-offset are the translations in horizontal and vertical direction between the origins of the two adjacent images. FIG. 10B shows a schematic diagram in calculation of strip-offset. Taking the image coordinate system of the left image, image 1 (1001) as the measurement coordinate system, the strip-offset (Ox, Oy) can be denoted by the coordinates of the origin, $O_2$ (1004) of the right image, image 2 (1002), which are the translations between origins of two images. Hence after the strip-offset, the coordinates of the origin $O_2$ (1004) of the image 2 (1002) become (1265, −8).

After acquiring the featureness and maximum correlation coefficient, stitching reliability r, which is the confidence that how good the two blocks or two images can be stitched, is calculated as follow:

$$r = w_0 \cdot \text{fetureness} + w_1 \cdot c$$

where $$w_0 + w_1 = 1$$

The $w_o$ and $w_1$ are weight factors, and are the predefined values. According to an embodiment of the present invention, $w_o$ and $w_1$ are equal to 0.8 and 0.2 respectively.

Figure 11:
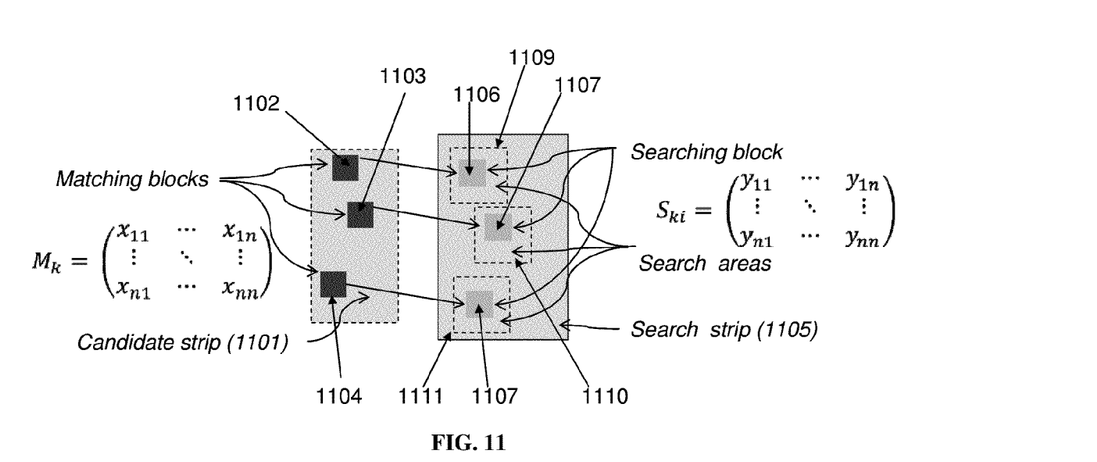
FIG. 11 shows how three matching block are compared with searching blocks in three search area to calculate correlation coefficients according to another embodiment of the presently claimed invention.

According to another embodiment of the presently claimed invention, more than one matching block is compared with searching blocks in more than one search area to find out more than one correlation coefficient and correlation maximum location. As shown in FIG. 11, three matching blocks 1102, 1103, and 1104 are employed, which are defined by three candidate feature points in a candidate strip 1101. The matching blocks 1102, 1103, and 1104 are compared with their corresponding searching blocks 1106, 1107, and 1108 in search areas 1109, 1110, and 1111 of a search strip 1005 respectively.

The correlation coefficient for $k^{th}$ matching block is calculated as below:

$$c_{ki} = \frac{\sum_{l,j=1}^{n}(x_{lj}-\overline{M}_k)(y_{lj}-\overline{S}_{ki})}{\sqrt{\sum_{k,j=1}^{n}(x_{lj}-M_k)^2}\sqrt{\sum_{l,j=1}^{n}(y_{lj}-\overline{S}_{ki})^2}} \text{ where}$$

$$\overline{M}_k = \frac{\sum_{i,j=1}^{n}x_{ij}}{n^2}, \overline{S}_{ki} = \frac{\sum_{i,j=1}^{n}y_{ij}}{n^2},$$

where $\overline{M}_k$ and $\overline{S}_{ki}$ are the mean intensities of the $k^{th}$ matching block and searching block respectively, and the $n^2$ is the total number of pixel, and $x_{ij}$ and $y_{ij}$ denote the pixel intensities.

The maximum correlation coefficient for $k^{th}$ matching block is determined as follow:

$$c_k = \max_i \{c_{ki}\}$$

The maximum correlation coefficient of the $k^{th}$ matching block, $c_k$ is selected from the correlation coefficients with the highest magnitude.

Since there is more than one maximum correlation location in the candidate strip, a strip-offset of the image is determined by a pre-defined weighted sum of offset values from each matching block. A method of weighting is as follow:

$$w_k = v_k / \Sigma v_i$$

where $v_i$ and $v_k$ are the variances of i-th and k-th matching block respectively, i=1, ..., K.

Similarly, the stitching reliability is derived from the pre-defined weight function of its featureness and the correlation maximum of each matching block.

$$r = w_0 \cdot \text{fetureness} + \Sigma_{k=1}^{K} w_k \cdot c_k$$

where $$\Sigma_{k=0}^{K} w_k = 1$$

where $W_k$ is a weighting factor.

An optimal stitching path in stitching all images is determined by utilizing a priority factor determined by the stitching reliability of the candidate strip deriving from the pre-defined weighted function of its featureness and the correlation maximum of each matching block.

According to an embodiment of the presently claimed invention, the best connection route for stitching a plurality of image is obtained by reliability oriented global max-span-tree since the stitching reliability considers not only how similar the overlapped image blocks are by the magnitude of correlation coefficient, but also how confident the similarity implies by the magnitude of featureness of strip containing theses image blocks, which is in accordance with human vision system.

A max span tree is a spanning tree of a weighted graph having maximum weight. It can be computed by negating the weights for each edge and applying Kruskal's algorithm.

In the mathematical field of graph theory, a spanning tree T of a connected, undirected graph G is a tree composed of all the vertices and some (or perhaps all) of the edges of G. Informally, a spanning tree of G is a selection of edges of G that form a tree spanning every vertex. That is, every vertex lies in the tree, but no cycles (or loops) are formed. On the other hand, every bridge of G must belong to T.

Kruskal's algorithm is a greedy algorithm in graph theory that finds a maximum spanning tree for a connected weighted graph. This means that it finds a subset of the edges that forms a tree that includes every vertex, where the total weight of all the edges in the tree is maximized.

The reliability-orientated global max-span-tree offer priority of stitching to those image pairs with strong featureness in overlapping region, ultimately minimizing the total stitching error.

Figure 12:
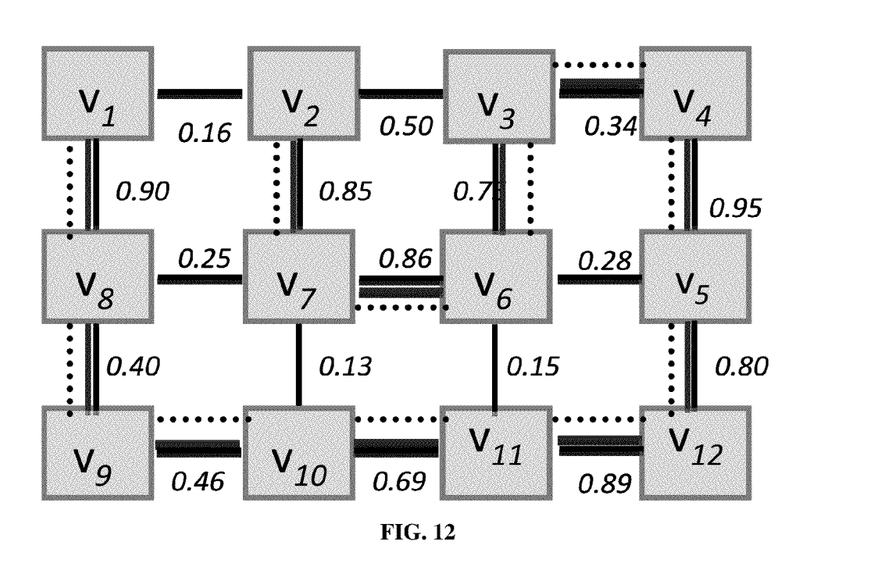
FIG. 12 shows an optimal stitching path in stitching twelve images according to an embodiment of the presently claimed invention.

An embodiment with twelve images is used for illustration regarding the reliability-global max-span-tree as shown in FIG. 12 according to the present invention. The total stitching reliability, F is calculated as following:

$$F(p) = \sum_{r_{ij} \in p} r_{ij}$$

where the $r_{ij}$ is the stitching reliability between $v_i$ and $v_j$, and where $p=(v_1, v_2, v_3, v_i \ldots v_n) \Sigma V \times V \times \ldots V$ is a path of length n, in which $v_i$ is the $i^{th}$ image, and $V=\{v_1, v_2, v_3 \ldots v_n\}$ is the image set for stitching.

Then the optimal path $P_o$ maximizing the total stitching reliability F is determined as follows:

$$p_o = \underset{p}{\arg\max} F(p)$$

The optimal path $P_o$ is selected form the paths with the total stitching reliability having maximum value.

Through the Kruskal's algorithm, the paths with highest values in the stitching reliability are subsequently connected among the images. According to the present embodiment, an image $V_4$ and image $V_5$ having a path with a stitching reliability of 0.95, which is the largest among all calculated stitching reliabilities, are connected at first. Then, an image $V_1$ and image $V_8$ are then connected due to having a stitching reliability of 0.90, which is the second largest among others. The remaining images are connected together with the same method, ultimately generating a best connection route with:
$V_1 \rightarrow V_8 \rightarrow V_9 \rightarrow V_{10} \rightarrow V_{11} \rightarrow V_{12} \rightarrow V_5 \rightarrow V_4 \rightarrow V_3 \rightarrow V_6 \rightarrow V_7 \rightarrow V_2$ The dotted line in FIG. 12 shows the paths for stitching the twelve images together. Thus, $P_o=(V_1, V_8, V_9, V_{10}, V_{12}, V_5, V_4, V_3, V^6, V_7)$. The maximum total stitching reliability selected form the total stitching reliabilities with the best connection route is 7.89 in this example.

Figure 13:
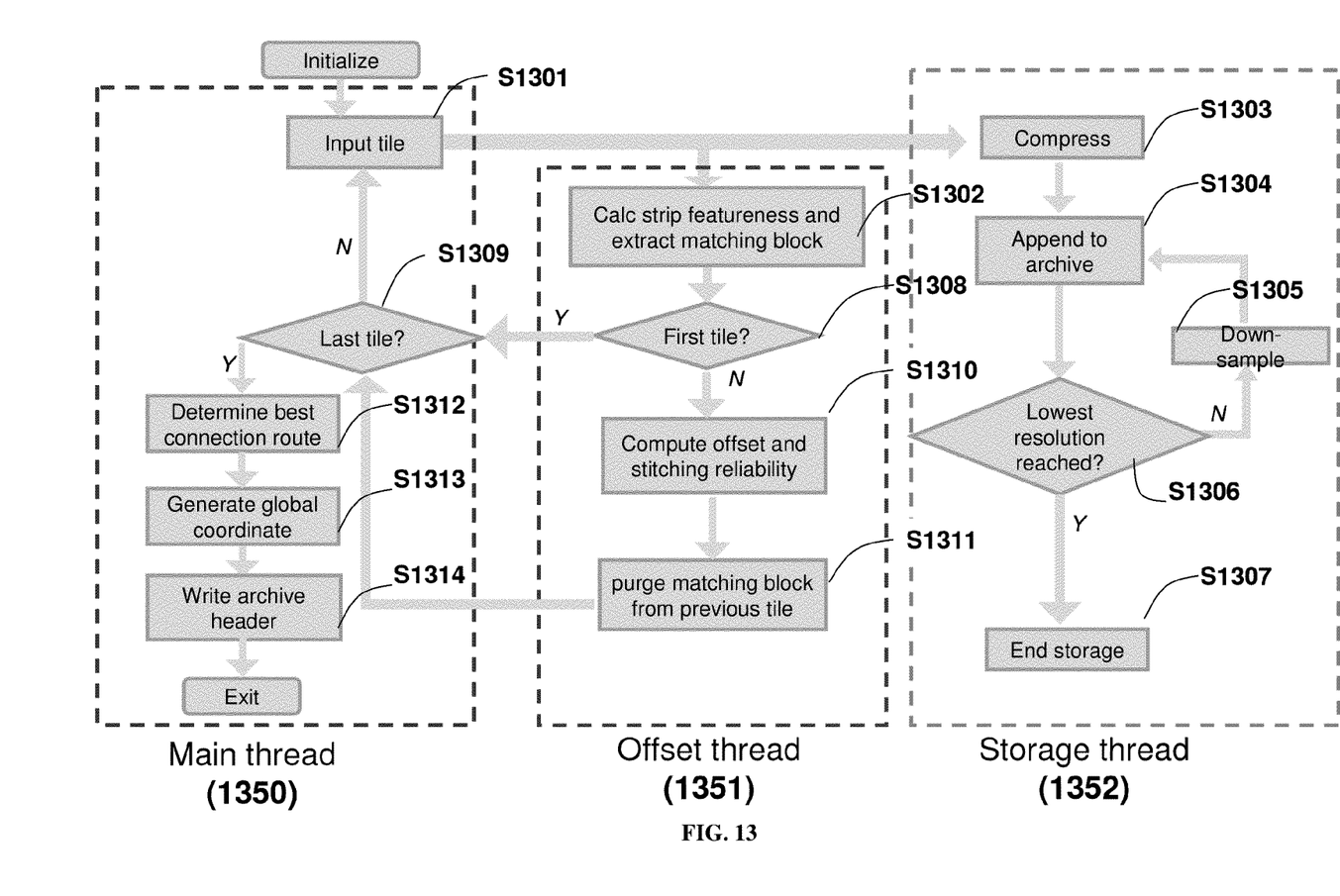
FIG. 13 shows a stitching process flow according to an embodiment of the presently claimed invention.

FIG. 13 shows a stitching process flow according to an embodiment of the presently claimed invention. The process flow employs three threads including main thread 1350, offset thread 1351, and storage thread 1352.

The stitching process flow is started by inputting a tile of an image in the main thread in step 1301. The featureness of a candidate strip of the tile is calculated, further extracting a matching block in the offset thread in step 1302. The inputted tile is compressed in the storage thread in step 1303. The compressed tile is appended to archive in step 1304. If the lowest resolution is reached (1305), the tile is stored in step 1306; otherwise, the tile is down-sampled in step 1307, following with going back to step 1304 till the lowest resolution of the tile being reached. If the tile is checked as a first tile (1308), the tile is further checked whether to be a last tile (1309). If not, another tile is inputted (1301), and the steps 1302 and 1308 are repeated. Once the tile is not the first tile (1308), the offsets of tile to its neighboring tiles are computed and the corresponding stitching reliabilities are determined in step 1310. The matching box from the previous tile is purged in step 1311, and then the tile is checked as a last tile (1309) in the main thread, the best connection route is determined in 1312. A global coordinate is generated in step 1313, and then archive header is written in step 1314 for ending up the stitching process flow.

The embodiments disclosed herein may be implemented using a general purpose or specialized computing device, computer processor, or electronic circuitry including but not limited to a digital signal processor (DSP), application specific integrated circuit (ASIC), a field programmable gate array (FPGA), and other programmable logic device configured or programmed according to the teachings of the present disclosure. Computer instructions or software codes running in the general purpose or specialized computing device, computer processor, or programmable logic device can readily be prepared by practitioners skilled in the software or electronic art based on the teachings of the present disclosure.

In some embodiments, the present invention includes a computer storage medium having computer instructions or software codes stored therein which can be used to program a computer or microprocessor to perform any of the processes of the present invention. The storage medium can include, but is not limited to, floppy disks, optical discs, Blu-ray Disc, DVD, CD-ROMs, and magneto-optical disks, ROMs, RAMs, flash memory devices, or any type of media or device suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for image stitching, comprising:
   transforming at least one candidate strip in a first image into at least one transformed strip by mathematical transformation, wherein spatial pixel information within the candidate strip is transformed into frequency domain expression including frequency coefficients with co-existing physical location information including indexes of transform coefficient;
   calculating featureness of the candidate strip of the image based on energies of transformed regions of the transformed strip, wherein the featureness is a degree of image detail, and describes a high frequency ratio;
   calculating a candidate feature point of the candidate strip based on a maximum of high frequency coefficients and the corresponding index of transform coefficient;
   determining a position of a matching block based on the candidate feature point;
   comparing the matching block with at least one search block in a search area in a second image to calculate correlation coefficients between the matching block and the searching blocks, wherein the correlation coefficient determines similarity between the matching block and the searching block;
   determining a maximum correlation coefficient, which is a maximum from the correlation coefficients;
   calculating an offset value from the matching block based on a correlation maximum location, where the searching block is in maximum correlation with the matching block;
   calculating a strip-offset between the first and second images based on the offset value; and
   repeating the above steps for remaining images.

2. The method of claim 1, further comprising:
   calculating a stitching reliability for each of the candidate strips based on the featureness and the maximum correlation coefficient, wherein the stitching reliability is the confidence that how good any two overlapped neighboring images are stitched; and
   determining a stitching path based on the stitching reliabilities from the candidate strips.

3. The method of claim 1, wherein the mathematical transformation is discrete wavelet transform or short-time Fourier transform.

4. The method of claim 1, wherein the frequency coefficients are calculated by the following equations:

$$c_{k_1,k_2}^{j-1} = \Sigma_{n_1}\Sigma_{n_2} h^0_{n_1-2k_1, n_2-2k_2} c_{n_1,n_2}^j (L_{j-1} L_{j-1})$$

$$d_{k_1,k_2}^{j-1} = \Sigma_{n_1}\Sigma_{n_2} h^1_{n_1-2k_1, n_2-2k_2} c_{n_1,n_2}^j (L_{j-1} H_{j-1})$$

$$e_{k_1,k_2}^{j-1} = \Sigma_{n_1}\Sigma_{n_2} h^2_{n_1-2k_1, n_2-2k_2} c_{n_1,n_2}^j (H_{j-1} L_{j-1})$$

$$f_{k_1,k_2}^{j-1} = \Sigma_{n_1}\Sigma_{n_2} h^3_{n_1-2k_1, n_2-2k_2} c_{n_1,n_2}^j (H_{j-1} H_{j-1})$$

$h^0 = h \times h^T$, $h^1 = h \times g^T$, $h^2 = g \times h^T$, $h^3 = g \times g^T$ where h and g are FIR quadrature—mirror filters of length N with:

$$g_n = (-1)^n h_{N-1-n}$$

when N is an even number,
T is a transpose of matrix or vector, and $n_1$ and $n_2$ are integers,
$c_{k_1-k_2}^{j-1}$, $d_{k_1-k_2}^{j-1}$, $e_{k_1-k_2}^{j-1}$, and $f_{k_1-k_2}^{j-1}$ denote low-low frequency coefficient, low-high frequency coefficient, high-low frequency coefficient, and high-high frequency coefficient, $k_1$ and $k_2$ denote the indexes of the transform coefficients.

5. The method of claim 4, wherein the energies of the transformed regions are calculated by the following equations:

$$E_{L_{j-1}L_{j-1}} = \Sigma_{k_1 k_2}(c_{k_1 k_2}^{j-1})^2 \quad E_{L_{j-1}H_{j-1}} = \Sigma_{k_1 k_2}(d_{k_1 k_2}^{j-1})^2$$

$$E_{H_{j-1}L_{j-1}} = \Sigma_{k_1 k_2}(e_{k_1 k_2}^{j-1})^2 \quad E_{H_{j-1}H_{j-1}} = \Sigma_{k_1 k_2}(f_{k_1 k_2}^{j-1})^2$$

where $E_{L_{j-1}L_{j-1}}$, $E_{L_{j-1}H_{j-1}}$, $E_{H_{j-1}L_{j-1}}$, and $E_{H_{j-1}H_{j-1}}$ denote the energy of low-low frequency, energy of low-high frequency, energy of high-low frequency, and energy of high-high frequency respectively.

6. The method of claim 1, wherein the featureness is calculated by the following equation:

$$\text{featureness} = 1 - \frac{E_{L_1 L_1}}{E_{L_1 L_1} + E_{L_1 H_1} + E_{H_1 L_1} + E_{H_1 H_1}}$$

where $E_{L_1 L_1}$, $E_{L_1 H_1}$, $E_{H_1 L_1}$, and $E_{H_1 H_1}$ denote energies of the transform coefficients with low frequency both in horizontal and vertical directions, with low frequency in horizontal direction but high frequency in vertical direction, with high frequency in horizontal direction but low frequency in vertical direction, with high frequency both in horizontal direction and vertical directions respectively.

7. The method of claim 1, wherein the candidate feature point is corresponds to the centre of the matching block.

8. The method of claim 1, wherein the correlation coefficient between the matching block and an $i^{th}$ searching block is calculated as follow:

$$C_i = \frac{(M - \overline{M}) \cdot (S_i - \overline{S}_i)}{\|M - \overline{M}\| \|S_i - \overline{S}_i\|} \text{ where}$$

-continued $$\overline{M} = \frac{\sum_{i,j=1}^{n} x_{ij}}{n^2}, \overline{S}_i = \frac{\sum_{i,j=1}^{n} y_{ij}}{n^2},$$

where $\overline{M}$ and $\overline{S}_i$ are the mean intensities of the matching block and $i^{th}$ searching block respectively, $n^2$ is the total number of pixel, and $x_{ij}$ and $y_{ij}$ denote the pixel intensities.

9. The method of claim 8, wherein the maximum correlation coefficient for the matching block is selected from the correlation coefficients with the highest magnitude as follow:

$$c = \max_i \{c_i\}$$

10. The method of claim 2, wherein the stitching reliability is calculated from a pre-defined weighted function of the featureness and the maximum correlation coefficient.

11. The method of claim 2, wherein the stitching reliability (r) is calculated as follow:

$$r = w_0 \cdot \text{fetureness} + w_1 \cdot c$$

where $$w_0 + w_1 = 1$$

where $w_o$ and $w_1$ are weight factors, and c is the maximum correlation coefficient.

12. The method of claim 2, wherein the stitching path is determined based on the reliability oriented global max-span-tree, offering priority of stitching images with high confidence of good stitching.

13. A method for image stitching, comprising:
transforming at least one candidate strip in a first image into at least one transformed strip by mathematical transformation, wherein spatial pixel information within the candidate strip is transformed into frequency domain expression including frequency coefficients with co-existing physical location information including indexes of transform coefficient;
calculating featureness of the candidate strip based on energies of transformed regions of the transformed strip, wherein the featureness is a degree of image detail, and describes a high frequency ratio;
calculating more than one candidate feature point of the candidate strip based on more than one high frequency coefficient and the corresponding indexes of transform coefficient;
determining more than one matching block based on the candidate feature points;
comparing each of the matching blocks with at least one search block in a search area of a second image to calculate correlation coefficients between each of the matching blocks and the searching blocks, wherein the correlation coefficient determines similarity between the matching block and the searching block;
determining a maximum correlation coefficient, which is a maximum from the correlation coefficients for each of the matching blocks;
calculating an offset value from each of the matching blocks based on a correlation maximum location of each of the matching blocks, where the searching block is in maximum correlation with the matching block;
calculating a strip-offset between the first and second images based on pre-defined weighted sum of offset values from the matching blocks; and
repeating the above steps for remaining images.

14. The method of claim 13, further comprising:
calculating a stitching reliability for each of the candidate strips based on the pre-defined weighted function of the featureness and the maximum correlation coefficients for each of the matching blocks, wherein the stitching reliability is a confidence that how good any two overlapped neighboring images are stitched; and
determining a stitching path based on the stitching reliabilities from the candidate strips.

15. The method of claim 13, wherein the correlation coefficient between a $k^{th}$ matching block and an $i^{th}$ searching block is calculated as follow:

$$C_{ki} = \frac{(M_k - \overline{M}_k) \cdot (S_{ki} - \overline{S}_{ki})}{\|M_k - \overline{M}_k\| \|S_{ki} - \overline{S}_{ki}\|} \text{ where}$$

$$\overline{M}_k = \frac{\sum_{i,j=1}^{n} x_{ij}}{n^2}, \overline{S}_{ki} = \frac{\sum_{i,j=1}^{n} y_{ij}}{n^2},$$

where $\overline{M}_k$ and $\overline{S}_{ki}$ are the mean intensities of the $k^{th}$ matching block and $i^{th}$ searching block respectively, and $n^2$ is the total number of pixel, and $x_{ij}$ and $y_{ij}$ denote the pixel intensities.

16. The method of claim 15, wherein the maximum correlation coefficient for the $k^{th}$ matching block is selected from the correlation coefficients with the highest magnitude as follow:

$$c_k = \max_i \{c_{ki}\}$$

17. The method of claim 16, wherein the stitching reliability (r) is calculated as follow:

$$r = w_0 \cdot \text{fetureness} + \Sigma_{k=1}^{K} w_k \cdot c_k$$

where $$\Sigma_{k=0}^{K} w_k = 1$$

where $W_k$ is a weighting factor for the $k^{th}$ matching block.

18. A method for stitching image, comprising:
loading a first image into a RAM;
saving at least one first candidate strip in the first image in the RAM;
transforming the first candidate strip into a first transformed strip by mathematical transformation, wherein spatial pixel information within the first candidate strip is transformed into frequency domain expression including high frequency coefficients with co-existing physical location information including indexes of transform coefficients;
calculating featureness of the first candidate strip based on the energies of transformed regions from the first transformed strip;
calculating a candidate feature point based on a maximum value of the high frequency coefficients and the corresponding index of coefficient;
determining a matching block based on the candidate feature point;

saving the matching block in the RAM;

loading a second image into the RAM;

determining a first search area of the second image;

comparing the first matching block with at least one searching block within the first search area to calculate correlation coefficients between the first matching blocks and the searching blocks within the first search area;

determining a maximum correlation coefficient among the correlation coefficients with the highest value, calculating an offset value from the first matching block based on a correlation maximum location, where the searching block is in maximum correlation with the matching block;

calculating a strip-offset between the first and second image based on correlation maximum location determined by the maximum correlation coefficient;

saving the strip-offset and maximum correlation coefficient in the RAM;

repeating the above steps for remaining images;

calculating a stitching reliability for each of the candidate strips of the images based on the featureness and maximum correlation coefficient; and determining a stitching path based on the stitching reliabilities from the candidate strips.

19. The method of claim 18, wherein more than one of the candidate feature point is used for determining more than one of the matching block.

* * * * *